Figure 4:
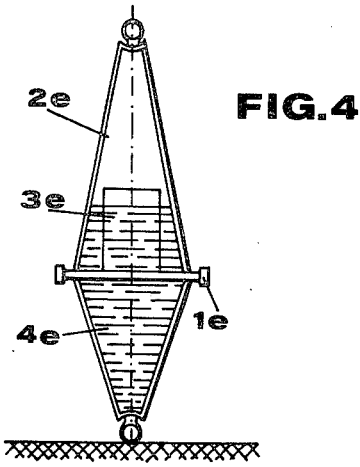

United States Patent [19]
Gessi

[11] 4,201,396
[45] May 6, 1980

[54] ROLLER-SKATE BICYCLE FOR AMUSEMENT, MOVING BY THE SWINGING MOVEMENT OF THE DRIVER

[76] Inventor: Giovanni Gessi, Via Claudia, 1971, Savignano S. Panaro, Modena, Italy

[21] Appl. No.: 870,510

[22] Filed: Jan. 18, 1978

[30] Foreign Application Priority Data

Jan. 21, 1977 [IT] Italy ................................ 3319 A/77

[51] Int. Cl.² ............................................ B62M 1/10
[52] U.S. Cl. ................................ 280/229; 301/41 W
[58] Field of Search ............... 280/216, 217, 220, 221, 280/229, 222, 226; 301/41 W, 105 R

[56] References Cited

U.S. PATENT DOCUMENTS

| | | | |
|---|---|---|---|
| 1,664,864 | 4/1928 | Rutherford | 280/229 |
| 1,733,952 | 10/1929 | Engesser | 280/229 |
| 2,780,497 | 2/1957 | Cameron | 301/41 W |
| 3,086,795 | 4/1963 | Hatcher | 280/221 |
| 3,647,241 | 3/1972 | Huyssen | 280/221 |

*Primary Examiner*—Robert R. Song
*Assistant Examiner*—John A. Carroll
*Attorney, Agent, or Firm*—J. Harold Nissen

[57] ABSTRACT

A roller-skate bicycle for stimulating the whole muscle-system of the driver, who, through his own swinging movement onto the rear wheel transmits the operating push to the linkages.

10 Claims, 6 Drawing Figures

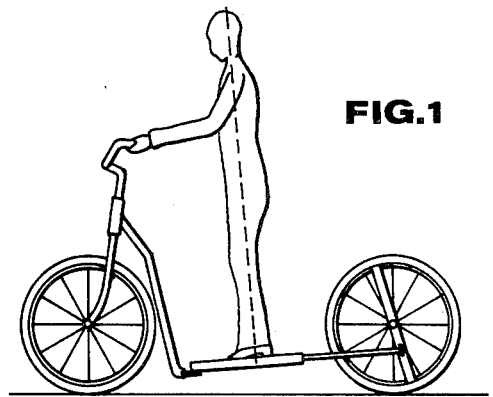
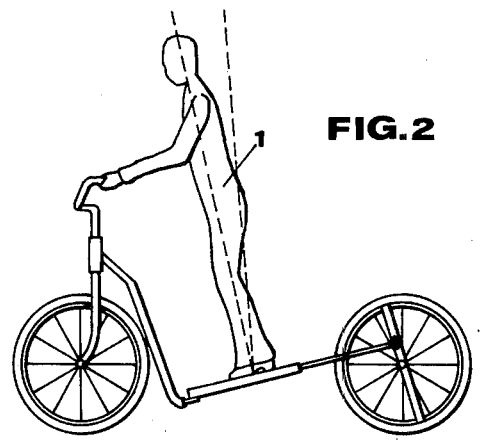
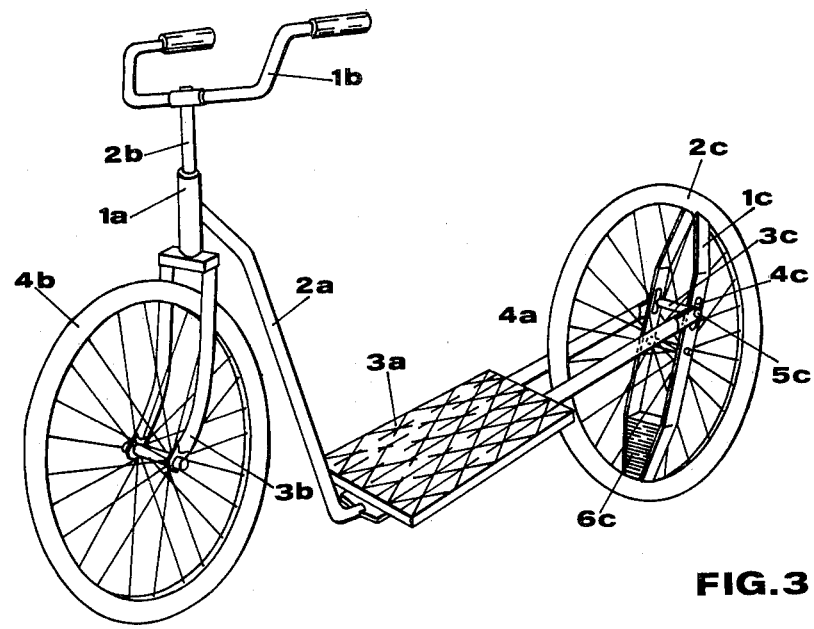

ROLLER-SKATE BICYCLE FOR AMUSEMENT, MOVING BY THE SWINGING MOVEMENT OF THE DRIVER

The present invention concerns a roller-skate bicycle for amusement, moving by the swinging movement of the driver, which allows to act on the organism, stimulating its activity and putting all the muscle-system into movement.

The aim of the present invention is to realize not only an amusement means, but, most of all, a sport means, which allows to act on the organism, stimulating its activity as it forces the body of the driver to re-establish continuously a certain balance condition, similar, for example, to the balance during horse-riding, and therefore putting the whole muscle-system into movement.

The roller-skate bicycle, according to the present invention, is, by itself, new in the art. In comparison to many other sport means, which are mostly to be used in closed rooms and therefore activate only one part of the muscle-system, said roller-skate bicycle is a cheap means and available for everyone, which stimulates the whole body, and unites to the physical exercise also the amusement, and not for the least, said bicycle allows to move outside, with the consequent, positive advantage to give to the organism, while it is under stress, fresh air.

It is therefore the task of the present invention to realize a means that unites sports and amusement, that favours a physical exercise which puts the whole muscle-system of the body into movement, and guarantees, just during the greatest stress, a perfect oxygenation.

This task is solved, according to the present invention, by realizing a roller-skate bicycle, the propulsion of which is determined by a particular swinging, respectively oscillation movement of the body of the driver which acts on a linkage, applied to the rear wheel, the rotation shaft of which is located excentrically with respect to the geometric centre of said wheel, and which exploits the effects of inertia and/or of the centrifugal force which arises in the system because of the combination of the operating means.

According to the fundamental concept of the present invention, the excentric rotation of the rear wheel, applied in conformity with the fork of the frame, causes a linkage movement, which impresses, in turn, an alternate, vertical movement to the footboard of the driver, placed on the lower part of the frame, the continuity of functioning of which is guaranteed by the continuous overcoming of the upper and lower critical rotation point of said wheel, according to the swinging, respectively oscillation movement of the driver.

According to the present invention, the roller-skate bicycle consists essentially in a frame, which is its central part, in a front, steering part and in an operating, rear part.

A sleeve is provided at the front end of the frame, said sleeve being integrant and liable part of the frame, within which the pin of the fork, to which the front wheel is applied, is supported and guided as to rotate. On the pin of this fork, thus rotably supported and guided, the handle bar of the roller-skate bicycle is fixed.

The main part of the frame consists in the fork, on which fork is rigidly fixed the footboard for the driver and at the end of which is excentrically fixed a linkage which, respectively to its own rotation axis—which is in correspondance with the excentric axis of the wheel— shows at its ends two shaped parts, diametrically counterposed, which take hold of the wheel. Said axis, which is common to the linkage and to the wheel, is adjustable by means of hems, appropriately disposed, and can be blocked by means of screw bolts. The particular shape of the linkage allows the inertia effect during the rotation, serving as a counterweight.

In this case, the forward push is given to the roller-skate bicycle according to the present invention, according to the impulse impressed to the linkage by the forward and backward oscillating movement of the driver, who thus displaces alternatively the center-of-gravity of the system.

Infact, after the driver has taken hold of the handle bars, having one foot on the ground and the other one on the footboard, he impresses the starting push and then stand on said footboard. The prosecutions of the movement takes place now by the overcoming of the upper and lower critical point in the excentric system of the rear wheel and according to the oscillating movement of the driver. Infact, once the upper critical point has been overcome, as the driver moves backwards, the footboard quickly goes down and thus an acceleration is impressed to the roller-skate. Now the driver moves forward, thus determining a necessary impulse as to overcome the lower critical point and consequently the remounting of the footboard.

In another embodiment of the present invention, the oscillating, forward and backward movement of the driver, can be replaced by a movement of the footboard which is placed with ball bearings on the frame, as to slide in alternate longitudinal sense, on a double-track way. Said movement is determined by linkage connections, external to the wheels, realized with cranks provided as extensions of the two ends of the excentric rotation shaft of the wheel, said cranks impressing a counterposed action to the excentric one of the rotation shaft of the rear wheel. In this case, the roller-skate obtains the operating push only by virtue of the deplacement of the weight of the driver who, taking hols of the handles of the handle bar, displaces alternatively the footboard forwards and backwards.

It can also be provided that the rear wheel is realized as a sealed tank for liquids, for example water, rotating around a shaft, excentric with respect to the wheel. Inside said wheel, realized as a sealed tank for liquids, is fixed, liable with the excentric shaft, a rigid paddle which, rotating in dragging with the shaft of the wheel and therefore with said wheel, performs a retention effect of the water contained inside the wheel, realized like a tank. Therefore, during the movement, a counterweight effect is realized, opposed to the centrifugal effect, which pushes the liquid in the radial direction. In this embodiment, in a very similar way, also the front wheel of said roller-skate bicycle is realized as a sealed tank for liquid.

The advantages achieved by means of the present invention consist in that the object of said invention has been realized as a sports means, and at the same time as an amusement means, which allows to act on the organism, stimulating the activity of the whole muscle-system, as it forces the body of the driver to continuously re-establish a determined balance condition, similar, for example, to the balance during horse-riding, and therefore putting the whole muscle-system into movement. Furthermore, the means according to the present invention is very cheap and available for everyone, and allows the exercise outside, with the consequent, positive advantage of giving to the organism fresh air, just when it is mostly under stress.

Figure 5:
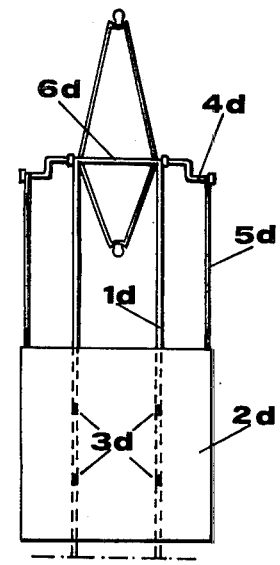
Figure 6:
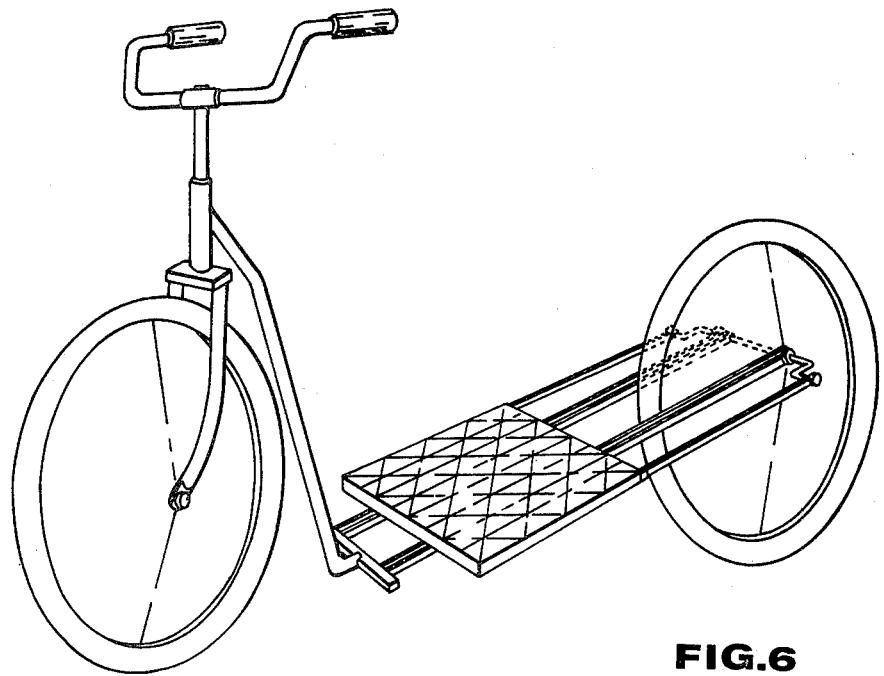

Two embodiments of the present invention will be shown in the following, for exemplifying and not limitative purposes, relating to the enclosed drawings. The figures show:

FIG. 1, a lateral view of the roller-skate, the linkage going up again;

FIG. 2, a lateral view of the roller-skate, the linkage going down, and the footboard being in the phase successive to the overcoming of the upper critical point;

FIG. 3, an axonometric view of the roller-skate, the footboard being rigidly fixed onto the frame, the horizontal position of which, respectively to the ground, changes alternatively according to the excentric movement of the rear wheel;

FIG. 4, a section of the rear wheel in another embodiment of the present invention, realized as a sealed tank for the liquid;

FIG. 5, a diagram, in top view, of the operating system in another embodiment of the present invention;

FIG. 6, an axonometric view of the roller-skate, in a combination of the embodiments according to FIGS. 4 and 5, i.e. with sliding footboard on a double-track way, and with wheels realized as tanks containing liquid.

As can be seen in FIG. 3, the roller-skate consists mainly in a frame (a), in a steering, front part (b) and in a rear part (c). All the numbers shown in the figures are accompanied by small letters a, b and c, according to the details cited in one of the corresponding part.

A sleeve 1a is provided at the front end of the frame, for the guide and support of rotating pin 2b of fork 3b, to which is excentrically fixed wheel 4b. On rotating pin 2b is fixed handle bar 1b.

The handle bar itself consists in tube 2a and linkage 4a on which is placed footboard 3a, near to tube 2a.

A linkage is excentrically fixed to fork 4a, said linkage showing, with respect to its excentric rotation axis 3c, at its ends, shaped parts, diametrically counterposed 1c and 6c, which take hold on wheel 2c, the rotation axis of which is the excentric axis 3c of the linkage; said axis, which is common to the linkage as well as to the wheel, is adjustable by means of hems or supports 4c and can be blocked by means of screw bolts 5c. The particular shape 6c allows the inertia effect during the rotation, serving as a counterweight.

In FIGS. 1 and 2 can be seen how the oscillating movement, forwards and backwards, of the driver causes the displacement of the center-of-gravity of the system, thus realizing the forward push of the roller-skate, following to the impuls impressed to the linkage.

In FIG. 4, 2e shows the rear wheel realized as a sealed tank for liquids, said wheel rotating around excentric shaft 1e, on said shaft being fixed, liable with the same, a rigid paddle 3e. Paddle 3e operates as a counterweight with respect to the centrifugal effect, which pushes the liquid 4e in radial direction.

In FIG. 5, 1d shows a sliding, double-track way for footboard 2d, said footboard being supported, for its sliding movement on said way, by ball bearings 3d. The alternate sliding movement, forwards and backwards, of the footboard, is transmitted by means of rigid connection rods 5, to handle linkages 4d which are integral part to excentric shaft 6d. In this case the roller-skate receives the operating push thanks to the action of the driver, who taking hold of the handle bars with his hands, displaces his weight alternatively forwards.

The above described embodiments obviously show not limitative examples; it is understood that said embodiments can be varied in the forms and the dimensions, without therefore going out of the scope of the invention.

What I claim is:

1. A rider powered vehicle, such as a roller-skate type bicycle for amusement and exercise, comprising:
   a frame;
   a footboard mounted to said frame for oscillatory movement with respect to said frame, the rider normally standing on said footboard during operation of the vehicle;
   a driven wheel having an off-center axle, said wheel being eccentrically rotatable about said axle;
   a rigid linkage rotatably mounting said wheel to said frame and in operative engagement with said footboard to convert oscillatory movement of said footboard into rotary movement of said driven wheel, said oscillatory movement having upper and lower critical points at which oscillatory movement transmitted to the off-center axle is free of non-radial components and is passed through by inertial forces generated in the system;
   means mounted on said driven wheel and operable for generating counterweight forces therein opposite to said axle whereby to generate inertial forces to facilitate operation of the vehicle.

2. The vehicle of claim 1 wherein said counterweight is mounted on said axle and extends radially therefrom.

3. The vehicle of claim 1 wherein said linkage comprises:
   an elongated slide mounting said axle directly to said frame, said footboard being slideably mounted on said slide for reciprocal movement thereon;
   an elongated rod, secured at one end to said footboard and a bent crank shaft, in engagement with said axle, said rod being operatively secured at its other end to said crank shaft to convert reciprocal sliding movement of said footboard into rotary movement of said crank shaft thereby to generate additional driving force for said driven wheel, from the sliding movement of said footboard.

4. The vehicle of claim 1 wherein said wheel includes an adjustable axle support comprising a pair of axle restraint brackets with opposed elongated slots along which said axle may be adjustably slid and secured by screw bolts thereby to permit adjustment of the vehicle rider power mechanism.

5. The vehicle of claim 3 including a pair of said slides, and means comprising ball bearings for mounting said footboard onto said slides.

6. The vehicle of claim 1, wherein said counterweight means comprises a tank for liquids extending 360° about said axle, and mounted for rotation with said driven wheel; and including a paddle mounted to said axle and extending into said tank to impede the rotation of water with said tank.

7. The vehicle of claim 1 wherein said counterweight means comprises a tank for liquids extending 360° about said axle and mounted for rotation with said driven wheel; and including a paddle mounted on said axle for restricted rotation thereabout whereby said paddle is operable to be dragged around said axle by liquid rotating with said tank, but at a retarded angular velocity.

8. The vehicle of claim 1, further comprising:
   a non-driven wheel having a central hub;

a tank for liquids extending 360° about said hub, and mounted for rotation with said non-driven wheel; and a paddle mounted to said hub and extending into said tank to impede the rotation of water with said tank.

9. The vehicle of claim 1 further comprising:
a non-driven wheel having a central hub;
a tank for liquids extending 360° about said hub and mounted for rotation with said driven wheel; and a paddle mounted on said hub for restricted rotation thereabout whereby said paddle is operable to be dragged around said hub by liquid rotating with said tank, but at a retarded angular velocity.

10. The vehicle of claim 1, wherein
said axle is eccentrically located with respect to the geometric axis of said driven wheel, and
said frame includes a fork, a follower wheel rotatably supported by said frame and driven by said driven wheel,
said driven wheel forming the rear wheel of said vehicle and said follower wheel forming the front wheel of said vehicle, and means associated with said follower wheel for steering thereof.

* * * * *